United States Patent
Wongsonegoro et al.

(10) Patent No.: US 7,593,427 B1
(45) Date of Patent: Sep. 22, 2009

(54) METHOD AND APPARATUS FOR AUTOMATIC DETECTION AND PROVISIONING OF DS3 FRAME FORMATS

(75) Inventors: Harris Wongsonegoro, Petaluma, CA (US); Edgar Abadines, Petaluma, CA (US); Marc A. Bennett, Petaluma, CA (US)

(73) Assignee: Cisco Technology, Inc., San Jose, CA (US)

( * ) Notice: Subject to any disclaimer, the term of this patent is extended or adjusted under 35 U.S.C. 154(b) by 768 days.

(21) Appl. No.: 09/962,047

(22) Filed: Sep. 21, 2001

(51) Int. Cl.
*H04J 3/07* (2006.01)
*H04L 12/28* (2006.01)
*G06F 15/16* (2006.01)

(52) U.S. Cl. .............. 370/470; 370/254; 370/467; 370/474; 370/506; 709/236

(58) Field of Classification Search ........... 370/252, 370/506, 446, 476, 512, 514, 524, 537, 465, 370/254–258, 352, 466, 467, 470, 471–474; 375/368, 371, 340; 709/236; 348/E13.068; 379/12, 22.02; 714/712
See application file for complete search history.

(56) References Cited

U.S. PATENT DOCUMENTS

| | | | |
|---|---|---|---|
| 4,674,088 A * | 6/1987 | Grover ...................... 370/506 |
| 5,553,056 A | 9/1996 | Bronte et al. ................. 370/13 |
| 5,557,616 A | 9/1996 | Cadieux et al. ............. 370/105 |
| 5,566,161 A * | 10/1996 | Hartmann et al. ........... 370/249 |
| 6,240,087 B1 | 5/2001 | Cummings et al. .......... 370/360 |
| 6,275,499 B1 | 8/2001 | Wynn et al. ................. 370/438 |
| 6,285,673 B1 | 9/2001 | Blackburn et al. .......... 370/360 |
| 6,765,926 B1 * | 7/2004 | Price et al. .................. 370/466 |
| 6,819,655 B1 * | 11/2004 | Gregson ..................... 370/242 |
| 2002/0061012 A1 * | 5/2002 | Thi et al. .................... 370/352 |

* cited by examiner

*Primary Examiner*—Afsar M. Qureshi
(74) *Attorney, Agent, or Firm*—Edell, Shapiro & Finnan, LLC

(57) ABSTRACT

Methods and apparatus for automatically detecting the frame format of a data signal and automatically provisioning a port based on the detected frame format are disclosed. According to one aspect of the present invention, a framing format detection mechanism that is suitable for use in a network within which a data signal is arranged to be transmitted includes a first device and a second device. The first device is arranged to be a part of a line card and in communication with a signal receiving port on the line card. The first device is also arranged to automatically determine a frame format associated with the data signal. The second device is arranged to display the frame format associated with the data signal substantially in real-time. In one embodiment, the first device is further arranged to automatically provision the port.

36 Claims, 14 Drawing Sheets

METHOD AND APPARATUS FOR AUTOMATIC DETECTION AND PROVISIONING OF DS3 FRAME FORMATS

BACKGROUND OF THE INVENTION

1. Field of Invention

The present invention relates generally to data communication systems. More particularly, the present invention relates to systems and methods for allowing the frame format of a signal received on a port to be determined in real-time and to perform actions based upon the determined frame format.

2. Description of the Related Art

The demand for data communication services is growing at an explosive rate. Much of the increased demand is due to the fact that more residential and business computer users are becoming connected to the Internet. Furthermore, the types of traffic being carried by the Internet are shifting from lower bandwidth applications towards high bandwidth applications which include voice traffic and video traffic.

DS3 traffic is a prevalent type of traffic in large networks. A DS3 signal generally has a bandwidth of approximately 44.736 megabits per second (Mbps), and may carry twenty eight DS1 signals. DS3 line cards which support DS3 traffic allow routers within a network to be connected to high-speed DS3 leased line services. In general, DS3 line cards include ports that are used to receive DS3 signals.

A DS3 signal generally includes multiple frames which contain series of bits that are arranged as rows of data. A frame in a DS3 signal includes 4760 bits that are divided into seven rows, or subframes, of data. The bits included in a frame include overhead bits and payload bits. The overhead bits include frame boundary bits which enable payload bits to be extracted from the frame correctly. Each frame includes twenty-one C-bits, which may be used as stuff control bits for an M23 framing format to indicate how bits are stuffed in a frame, as will be appreciated by those skilled in the art. In other words, C-bits may identify the contents of M23 stuff bits. C-bits may also be used to account for rate differences in the transmission of frames in an M23 format.

DS3 signals typically have three possible frame or framing formats, namely a C-Bit parity or C-Bit format, an M23 format, or an unframed format. A signal with a C-bit frame format generally uses C-bits for purposes other than identifying the contents of stuff bits, since there are no stuff bits in a C-Bit format. For example, C-bits in frames of a signal that is of a C-Bit format may provide path parity information, and status information to initiate remote loops. A signal of an M23 format generally includes a multiplexed scheme which provides for transmission of seven DS2 channels.

Properly identifying a frame format for a DS3 signal or DS3 traffic is generally necessary in order to enable a port on which the DS3 signal is to be received to be properly configured. When a port is configured or provisioned incorrectly, the payload of received frames may be corrupted as some bits may be interpreted as being payload bits when those bits are not part of the payload. By way of example, as part of C-bit usage, a frame that is of a C-Bit format generally includes a far end loopback mechanism, while a frame that is of an M23 format does not use a loopback mechanism as a part of C-bit usage. Hence, provisioning a port to expect a signal of a C-Bit format when a signal of an M23 format is received may result in the signal being misread.

FIG. 1a is a process flow diagram which illustrates the steps associated with one conventional method of provisioning a DS3 port. A provisioning process 102 begins at step 104 in which a network administrator determines a signal type, or the format of a signal, that is to be received on a DS3 port. As will be appreciated by those skilled in the art, a trial and error process is often used to provision a DS3 port to be consistent with a particular format. That is, a network administrator may essentially guess what the format of an expected signal will be, then provision the DS3 port accordingly. Alternatively, a network administrator may contact the network administrator associated with a system which is to transmit a signal to the port, and ask that network administrator about the frame format of the signal that is to be transmitted. Contacting a network administrator is often be inconvenient and inefficient, particularly when there are multiple ports to be configured.

Once the network administrator determines the format of the signal, then the network administrator manually configures the port in step 108. Methods used to configure a port are well-known to those skilled in the art. After the port is configured, the process of provisioning a port is completed.

FIG. 1b is a process flow diagram which illustrates the steps associated with a second conventional method of provisioning a DS3 port. A provisioning process 120 begins at step 122 in which a network administrator installs a test set on a DS3 line which is in communication with a port that is configured to receive a signal. In other words, the test set is installed within a DS3 circuit path. After the test set is installed, a signal is received on the DS3 line and, hence, by the test set, in step 126. The test set then determines that type of signal that is being received on the port in step 130. As will be appreciated by those of skill in the art, some test sets may not be arranged to determine signal types.

Once the test set determines the frame format of the signal that is being received on the port in step 130, the port is configured in step 134. In general, the port may be manually configured by the network administrator. The port is typically configured to be consistent with the frame format determined by the test set. After the port is configured, the network administrator generally uninstalls the test set in step 138, and the process of provisioning a port is completed. It should be noted that once the port is provisioned, originating DS3 equipment is connected or reconnected to the port.

While a test set is generally effective in determining the format of a DS3 signal that is to be received on a port, test sets or test equipment is often relatively expensive. As DS3 lines and DS3 traffic are prevalent in networks, many systems would generally require multiple test sets to detect the frame format associated with DS3 lines, as well as to provision ports associated with DS3 lines. In particular, when multiple lines carry DS3 traffic, multiple test sets are typically needed if the frame format of every line is to be determined, unless one or a few tests sets are sequentially used on each of the multiple lines. Hence, the proliferation of test sets often proves to be expensive and, in a case in which a single test set is used sequentially, time-consuming.

Further, tests sets generally must be positioned on a DS3 line or within a DS3 circuit path in order for the test set to accurately monitor the frame format of signals within the path. Positioning tests set within a DS3 circuit path, as for example to obtain frame format information while signals are substantially continuously being sent through the circuit path, is a relatively intrusive process. In addition to being intrusive, positioning test sets within a DS3 circuit path is often also a time-consuming and, hence, an inefficient, process.

Therefore, what is needed is an efficient, inexpensive method for detecting the frame format of a DS3 signal. Specifically, what is desired is a convenient, relatively inexpensive method for automatically detecting the frame format of a DS3 signal, and for automatically provisioning a port which receives the DS3 signal.

SUMMARY OF THE INVENTION

The present invention relates to a system and a method for automatically detecting the frame format of a data signal and automatically provisioning a port based on the detected frame format. According to one aspect of the present invention, a framing format detection mechanism that is suitable for use in a network within which a data signal is arranged to be transmitted includes a first device and a second device. The first device is arranged to be a part of a line card and in communication with a signal receiving port on the line card. The first device is also arranged to automatically determine a frame format associated with the data signal. The second device is arranged to display the frame format associated with the data signal substantially in real-time. In one embodiment, the first device is further arranged to automatically provision the port.

A framing format detection mechanism which is at least partially integrated with a line card enables the frame format of a signal received on a port of the line card to be readily monitored substantially without requiring the use of relatively expensive, dedicated monitoring equipment, e.g., test sets. Hence, diagnostic information is readily available to a network administrator at a relatively low cost. Typically, the framing format detection mechanism also enables the network administrator to select either a manual provisioning option or an automatic provisioning option to provision the port. The selection of the automatic provisioning option allows the framing format of the port to be provisioned substantially without requiring additional input from the network administrator.

According to another aspect of the present invention, a system for provisioning a port of a line card that is arranged to receive a signal transmitted across a link includes means for receiving a plurality of frames included in the signal on the port. The system also includes means for automatically determining a frame format associated with the plurality of frames and means for displaying the frame format associated with the plurality of frames. The frame format of the plurality of frames is automatically determined using the received plurality of frames.

In one embodiment, the system includes means for automatically configuring the port based on the frame format associated with the plurality of frames. In such an embodiment, the system may also include means for manually configuring the port, as well as means for allowing a selection to be made between manually configuring the port and automatically configuring the port.

According to still another aspect of the present invention, a line card includes a port, a detection mechanism, and a provisioning mechanism. The port is arranged to be coupled to a data transmissions link and to receive a data signal through the data transmissions link. The detection mechanism is arranged to monitor the port and to automatically determine a frame format of the data signal received on the port, while the provisioning mechanism is arranged to provision the frame format of the port. In one embodiment, the provisioning mechanism automatically provisions the port to be consistent with the determined frame format of the data signal.

In another embodiment, the detection mechanism reads bits from a plurality of frames of the data signal and processes the bits to automatically determine the frame format of the data signal. In such an embodiment, the bits are generally overhead bits associated with the frames.

According to yet another aspect of the present invention, a method for automatically determining a frame format of a signal received on a port of a line card includes receiving a plurality of frames of the signal on the port, and automatically determining when at least a first frame of the plurality of frames is consistent with a first format. When it is determined that the first frame is not consistent with the first format, it is automatically determining if the first frame of the plurality of frames is consistent with a second format. If it is determined that the first frame is not consistent with the second format, then the frame format of the signal is identified as being consistent with a third format.

In one embodiment, the method also involves updating a display to indicate that the frame format of the signal is consistent with the third format when it is determined that the first frame is not consistent with the second format, updating the display to indicate that the frame format of the signal is consistent with the first format when it is determined that the first frame is consistent with the first format, and updating the display to indicate that the frame format of the signal is consistent with the second format when it is determined that the first frame is consistent with the second format. In another embodiment, identifying the frame format of the signal as being consistent with the third format may include automatically determining when the first frame of the plurality of frames is consistent with the third format.

According to another aspect of the present invention, a method for provisioning a port associated with a line card includes receiving a plurality of frames of a signal on the port, and automatically determining a frame format of the signal. The frame format of the signal is automatically determined using the plurality of frames received on the port. The method also includes configuring the port based on the frame format of the signal. In one embodiment, automatically determining the frame format of the signal includes automatically determining the frame format of the signal using circuitry or software associated with the line card, and configuring the port includes automatically configuring the port using the circuitry. In another embodiment, the method also includes determining when the port is to be configured automatically using circuitry or software associated with the line card. When it is determined that the port is to be automatically configured, the port is automatically configured based on the frame format of the signal.

These and other advantages of the present invention will become apparent upon reading the following detailed descriptions and studying the various figures of the drawings.

BRIEF DESCRIPTION OF THE DRAWINGS

The invention may best be understood by reference to the following description taken in conjunction with the accompanying drawings in which.

DETAILED DESCRIPTION OF THE EMBODIMENTS

To accurately provision or configure a port of a DS3 line card, or substantially any port which receives DS3 signals, the frame format of a signal that is to be received by the port generally must be determined. Test sets or test equipment is often positioned on a DS3 line or within a DS3 circuit path to determine the frame format of signals within the path. Test sets are generally relatively expensive, and positioning a test set such that the test set may monitor a line over which a signal is being received is often intrusive and time-consuming.

In one embodiment of the present invention, automatically detecting the frame format or mode of a DS3 signal received on a port of a line card using circuitry on the line card, and displaying the detected frame format in real time, allows a network administrator to readily identify the frame format of the received signal. Hence, providing the network administrator with up-to-date, or current, information associated with a frame format allows the network administrator to accurately monitor the received signal and to readily obtain diagnostic information in real-time without using a separate test set. In addition, providing up-to-date information associated with the frame format of a signal received on a port enables the port to be provisioned, either manually or automatically, based upon the up-to-date information.

By including a frame format detection device as a part of a line card, e.g., a DS3 card, the frame format of a received signal may be determined efficiently and relatively inexpensively. Providing diagnostic information using a device which may be an integral part of a line card enables such information to be available to a user without requiring the use of relatively expensive test equipment which is typically manually positioned within a circuit path and, hence, is time-consuming to use. Further, when a device that is a part of a line card allows the ports on the line card to be automatically provisioned, the expense and time associated with provisioning ports is also reduced by substantially eliminating the need for test set.

C-bits in a frame may be used to determine whether the frame and, hence, the DS3 signal which includes the frame, is of an M23 frame format or of a C-Bit frame format. C-bits are present in both M23 and C-Bit frame formats, as will be appreciated by those skilled in the art. For an M23 frame format, C-bits are used for bit stuffing. Accordingly, the state of the C-bits in any given M23 frame is generally unpredictable. For a C-Bit frame format, C-bits are generally used for conveying additional status and control functions. In generally, there are twenty-one C-bits in a frame. These C-bits are arranged such that there are three C-bits for each of seven rows of data. When a frame is consistent with a C-Bit frame format, eleven of the C-bits are set to a value of one.

Figure 1A:
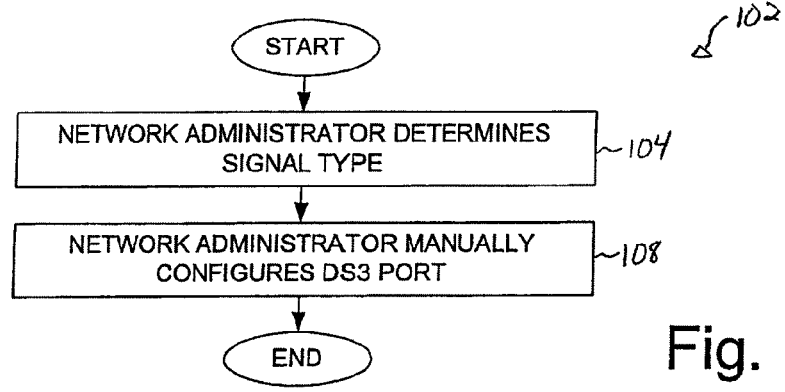
FIG. 1a is a process flow diagram which illustrates the steps associated with one conventional method of provisioning a DS3 port.
Figure 1B:
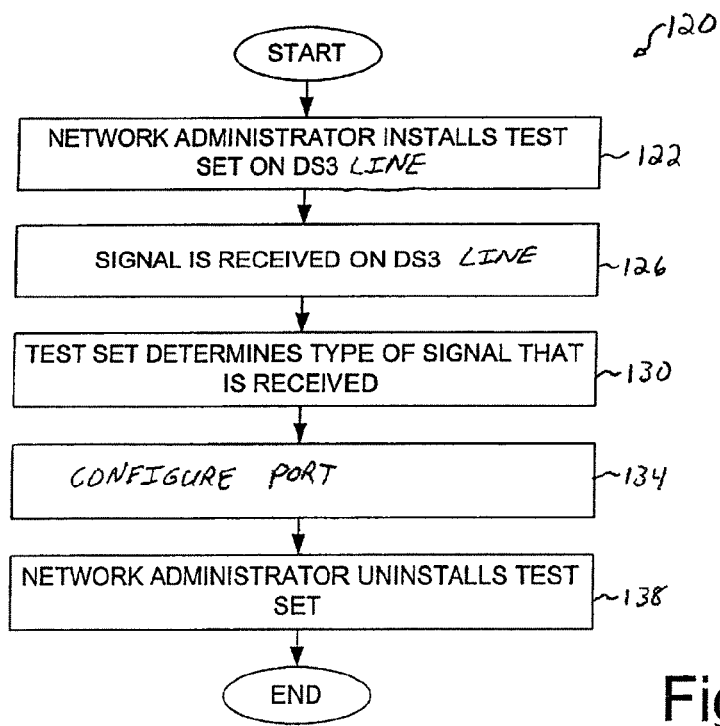
FIG. 1b is a process flow diagram which illustrates the steps associated with a second conventional method of provisioning a DS3 port.
Figure 2:
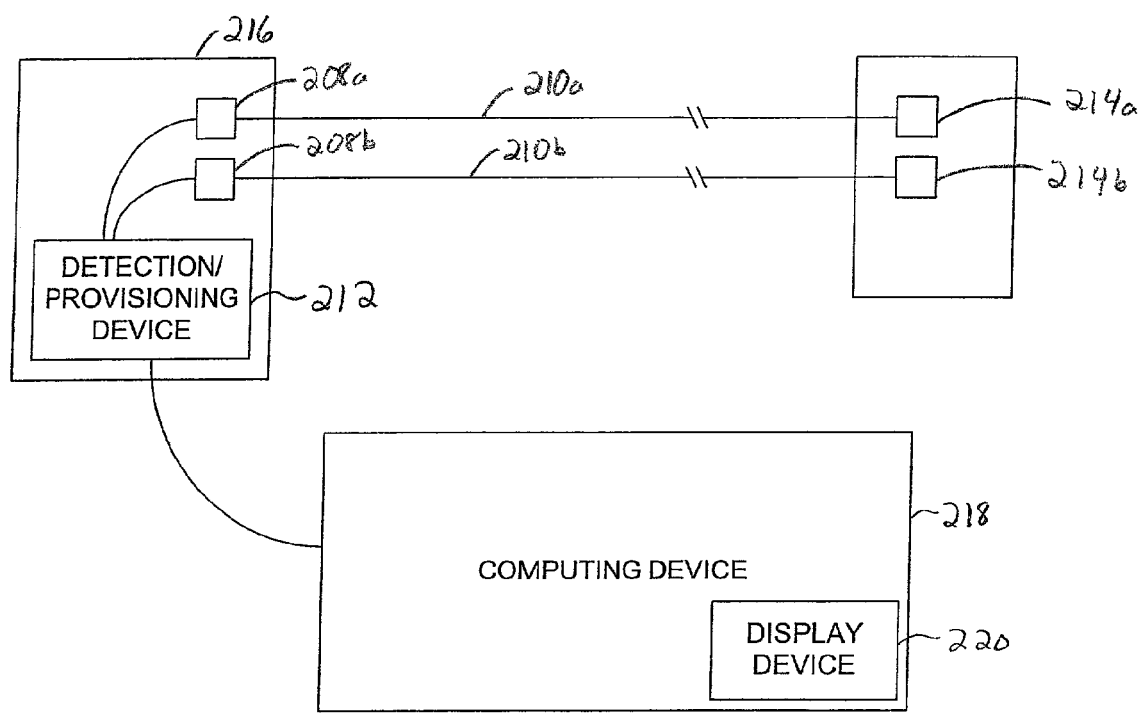
FIG. 2 is a diagrammatic representation of a system which is arranged to detect a DS3 framing format of a received signal in accordance with an embodiment of the present invention.

By studying the C-bits of a framed DS3 signal, it may be determined whether the frame is consistent with an M23 frame format or a C-Bit frame format. Further, by studying the bits of a signal looking for framing bits, it may be determined whether the signal is of an unframed, or out-of-frame, format. A device which studies frames may be used to monitor a port which receives a signal. FIG. 2 is a diagrammatic representation of a system which is arranged to detect a DS3 framing format of a received signal in accordance with an embodiment of the present invention. A detection device 212 is coupled to at least one port 208 which receives signals across communications links 210 from at least one port 214 which sends signals across communications links 210. Detection device 212, which may include circuitry and memory devices, and port 208 are generally part of an overall line card 216, e.g., a DS3 line card. Links 210 may be network links or fibers which are arranged to transfer or carry DS3 signals between network nodes.

Detection device 212 is generally coupled to a computing device 218 which includes a display device 220. Computing device 218 may, in one embodiment, cooperate with detection device 212 which polls bits associated with frames which are received on ports 208, and analyzes the polled bits. Typically, detection device 212 samples bits, e.g., at a rate of approximately 11 bits approximately every 100 microseconds, of frames and interprets the bits to determine a frame format of the overall signal which includes the frames. Computing device 218 obtains information relating to a frame format from detection device 212, and displays a representation of the information on display device 220. Specifically, in one embodiment, detection device 212 is a hardware device which executes a frame format detection algorithm while software embedded in line card 216 updates frame format information that is then communicated to device 218 which provides the frame format information to display device 220 which displays the frame format information through a graphical user interface (GUI). Although the format used to display frame format information may vary, one example of a display format will be described below with respect to FIG. 9*a*.

In addition to being arranged to determine a frame format for a received signal, detection device 212 is also typically arranged to automatically provision ports 208. The automatic provisioning of ports 208 will be described below with reference to FIGS. 6 and 7. It should be appreciated that, in one embodiment, detection device 212 may operate in conjunction with computing device 218 to automatically provision ports 208.

Although a single detection device 212 has been shown as being suitable for provisioning multiple ports of a DS3 card, such as one that is suitable for use with an ONS15454 platform available from Cisco Systems, Inc., of San Jose, Calif., it should be appreciated that separate detection devices may instead be used to detect the format of signals received on each port. That is, ports 208*a* and 208*b* may each have dedicated detection devices. Alternatively, only one of ports 208*a* and 208*b* may have an associated detection device 212, as for example when only one of ports 208*a* and 208*b* is in use.

Figure 3A:
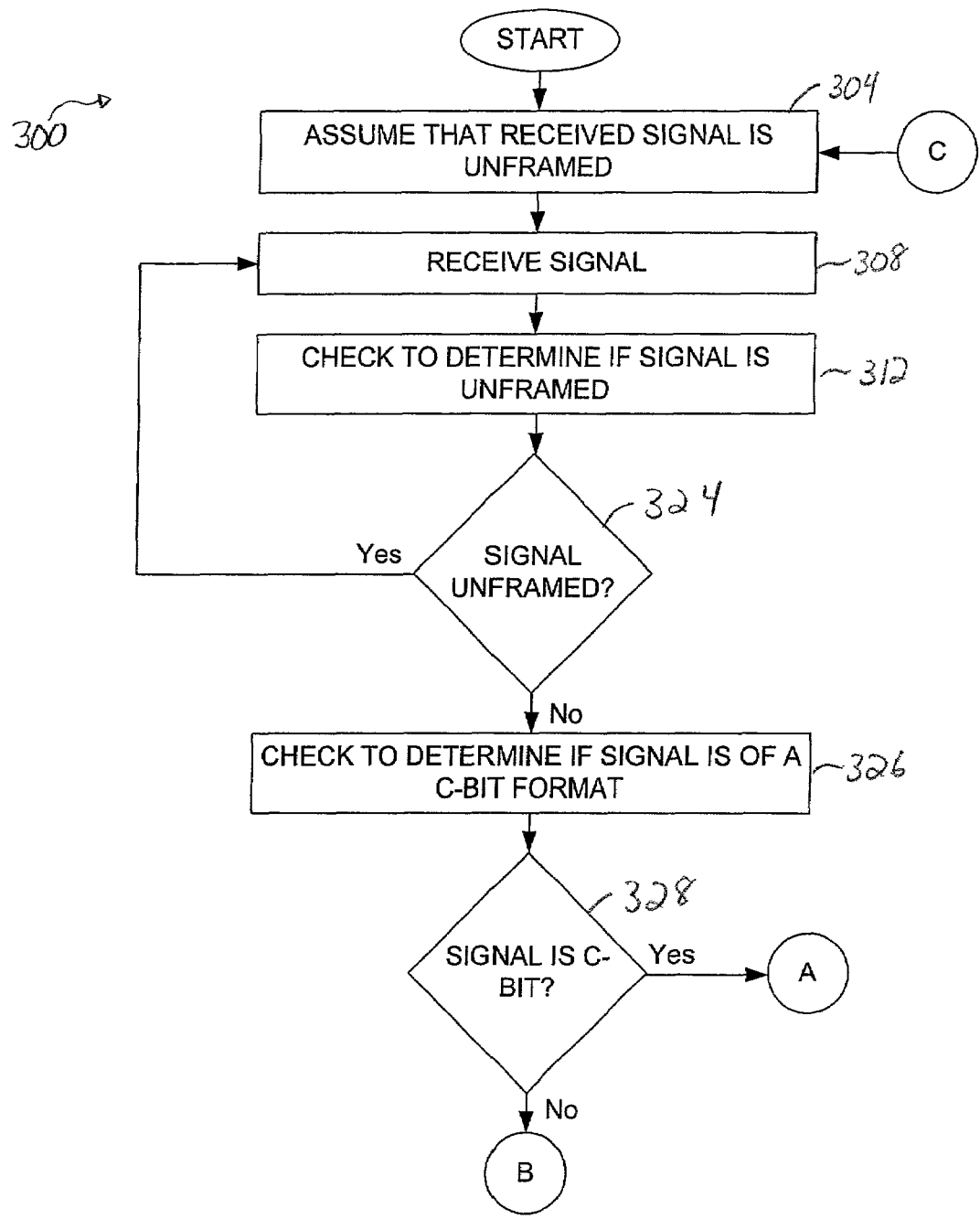
FIGS. 3a-c are a process flow diagram which illustrates the general steps associated with detecting a frame format of a signal received on a port in accordance with an embodiment of the present invention.
Figure 3B:
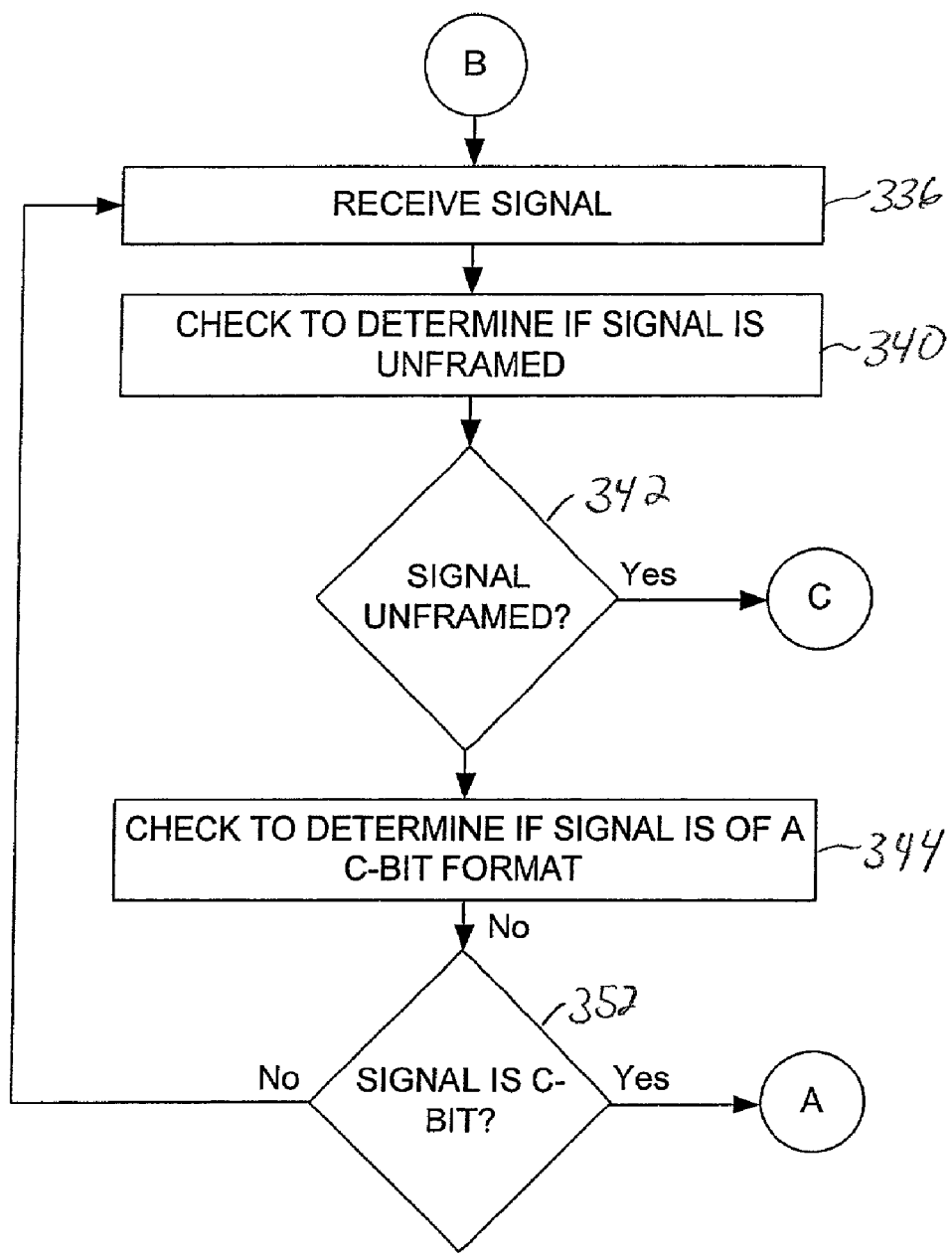
Figure 3C:
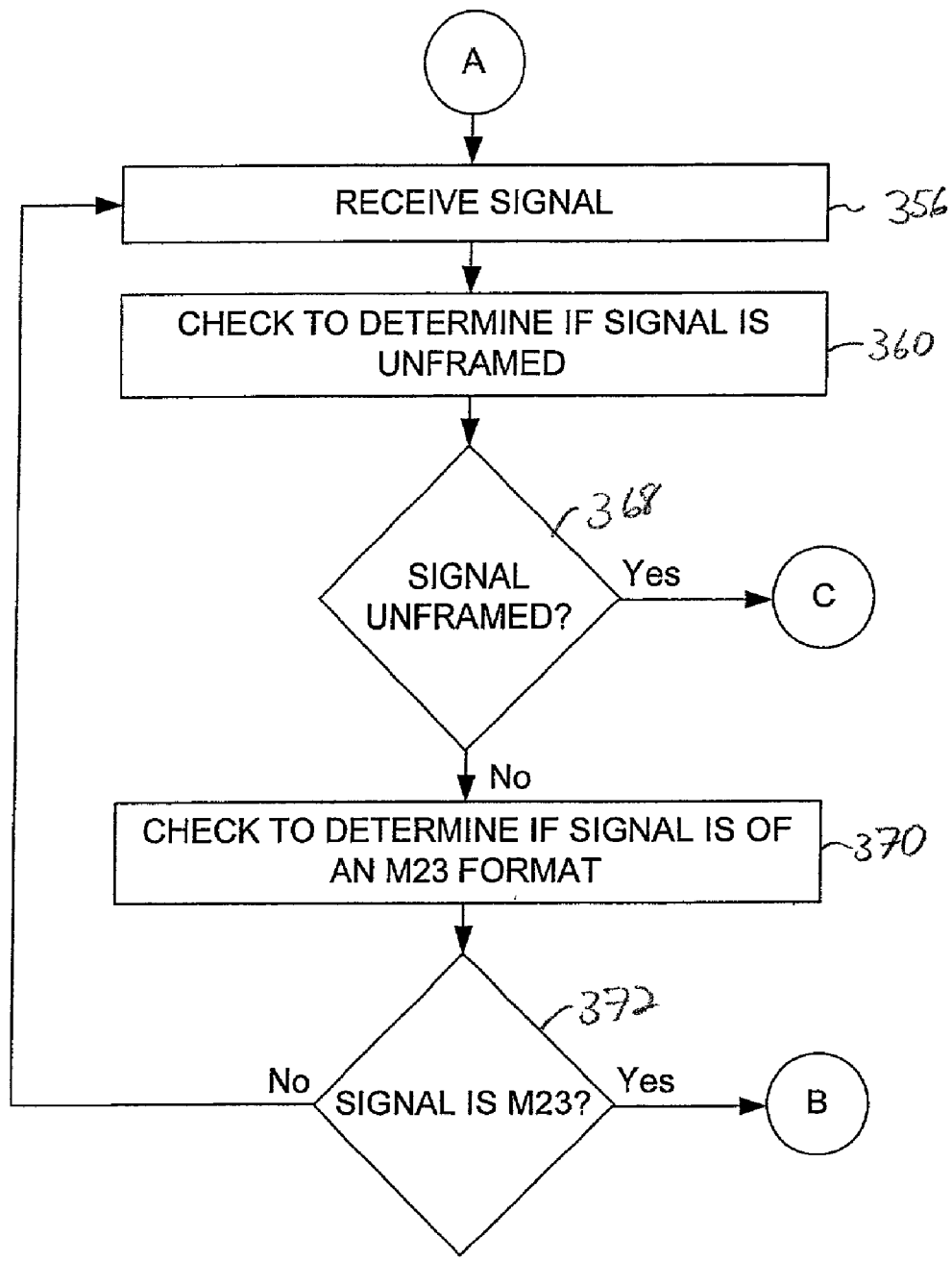

Referring next to FIGS. 3*a-c*, one algorithm for automatically detecting a frame format associated with a port will be described. FIGS. 3a-c are a process flow diagram which illustrates the steps associated with detecting a frame format of a signal received on a port in accordance with an embodiment of the present invention. A process 300 begins at step 304 in which an assumption is made that a signal that is to be received is unframed. That is, it is initially assumed that an incoming DS3 signal on a monitored port is out of frame.

A check is performed in step 312 to determine if the signal that is received is unframed. Once the check is performed to determine if the received signal is unframed, and a determination is made in step 324 regarding whether the signal is unframed, e.g., a determination is made regarding whether the most recently received frames of the signal are unframed. If it is determined that the signal is unframed, then the unframed signal continues to be received at step 308. Alternatively, if it is determined that the signal is not unframed, then a check is performed in step 326 to determine if the signal is of a C-bit format. In step 328, a determination is made regarding whether the signal is of a C-Bit format. If it is determined that the signal is not of a C-Bit format, then the signal is generally assumed to be of an M23 format, and the signal continues to be received in step 336 under the assumption that the signal is of an M23 format. In one embodiment, the display associated with the port is updated to indicate that a signal of an M23 format is being received. The signal received on the port is effectively constantly monitored such that the format of the signal may be updated as appropriate, i.e., such that the actual format of the signal at substantially any given time may be determined. A check is made in step 340 to determine if the signal is unframed. If it is determined in step 342 that the signal is unframed, process flow returns to step 308 in which the signal is received as an unframed signal, and the display associated with the port is updated to indicate that the signal is unframed.

If it is determined in step 342 that the signal is not unframed, then a check is performed in step 344 to determine if the signal is of a C-bit format. If it is determined in step 352 that the signal is not a C-Bit signal, then the indication is that the signal is an M23 signal. Accordingly, process flow returns to step 336 in which the signal is received or, more specifically, additional frames of the signal are received, as being of an M23 format. On the other hand, if it is determined in step 352 that the signal is a C-Bit signal, then process flow proceeds to step 356 in which the signal is received, and the display associated with the port is updated to indicate that the signal is of a C-Bit format. Then, a check is made to determine if the signal is unframed in step 360.

If it is determined in step 368 that the signal is unframed, process flow moves from step 368 to step 308 in which the signal, e.g., additional frames of the signal, continues to be received. Alternatively, if the determination in step 368 is that the signal is not unframed, then a check is performed in step 370 to determine if the signal is of an M23 format. If it is determined in step 372 that the signal is an M23 signal, then process flow returns to step 336 in which the signal continues to be received. On the other hand, if it is determined in step 372 that the signal is not of an M23 format, then process flow moves from step 372 to step 356 in which the signal continues to be received. Returning to step 328, it if is determined that the signal is of a C-bit format, then process flow also moves to step 356.

Figure 4A:
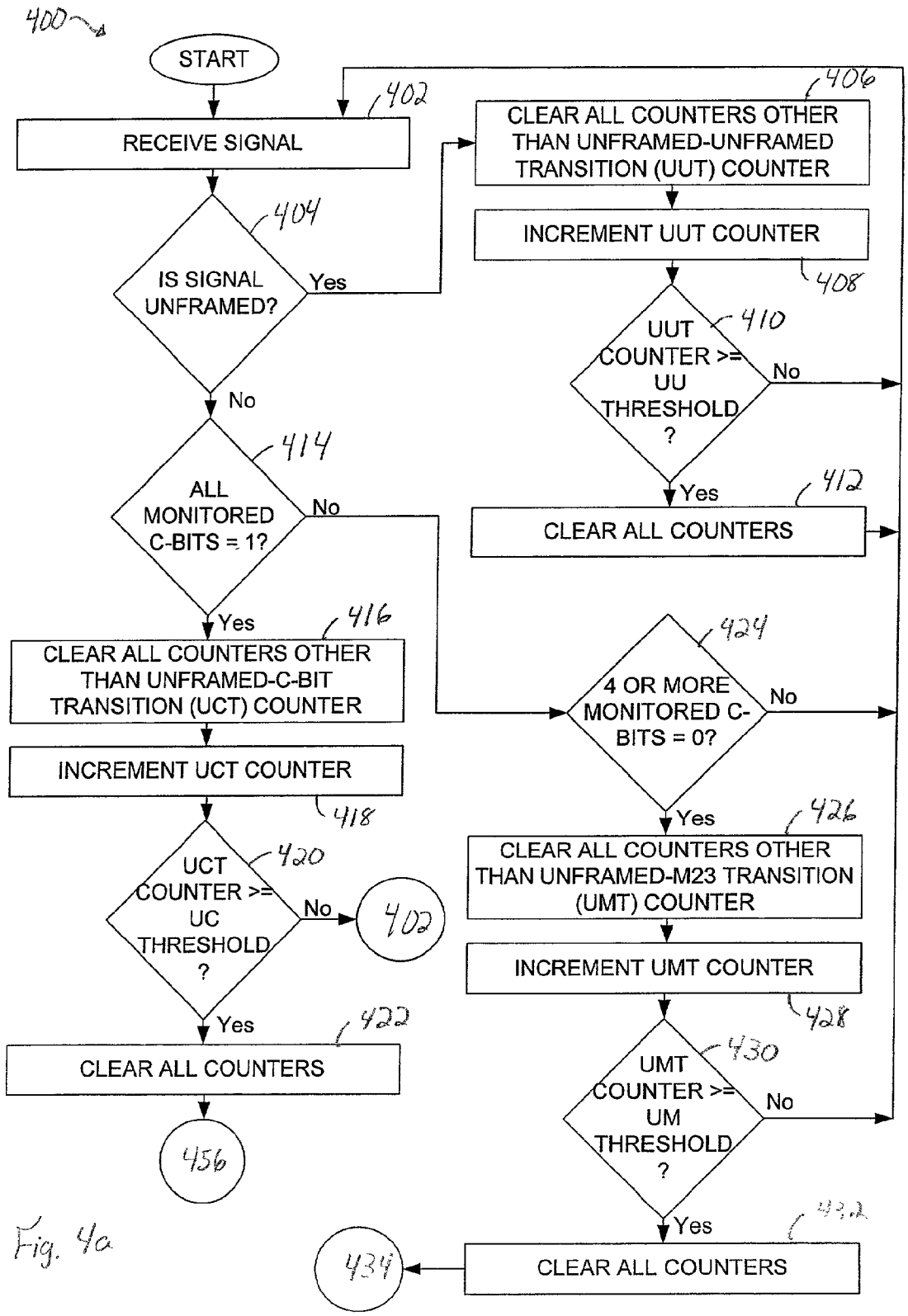
FIGS. 4*a-c* are a process flow diagram which illustrates the steps associated with one specific embodiment of detecting a frame format of a signal received on a port in accordance with of the present invention.
Figure 4B:
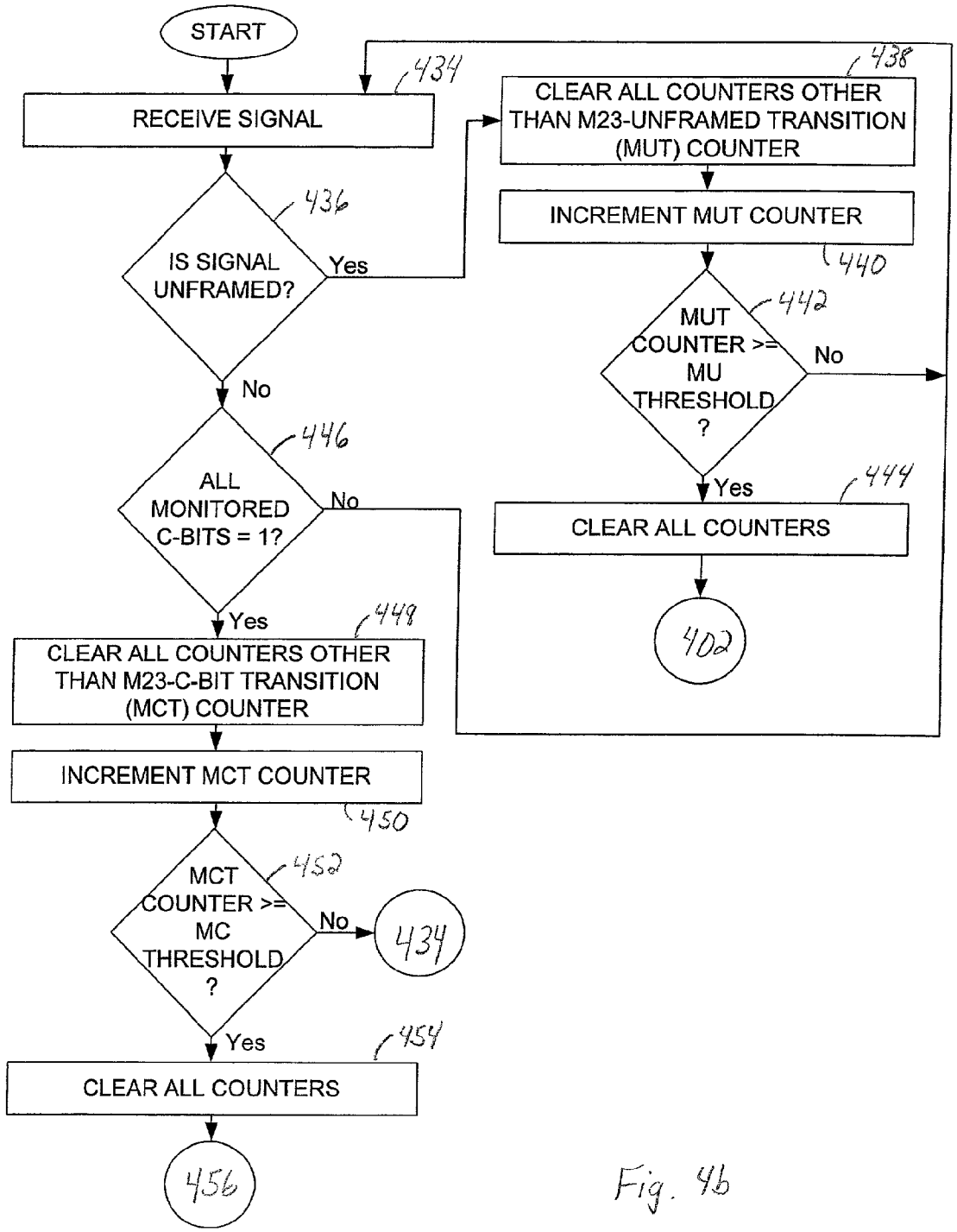
Figure 4C:
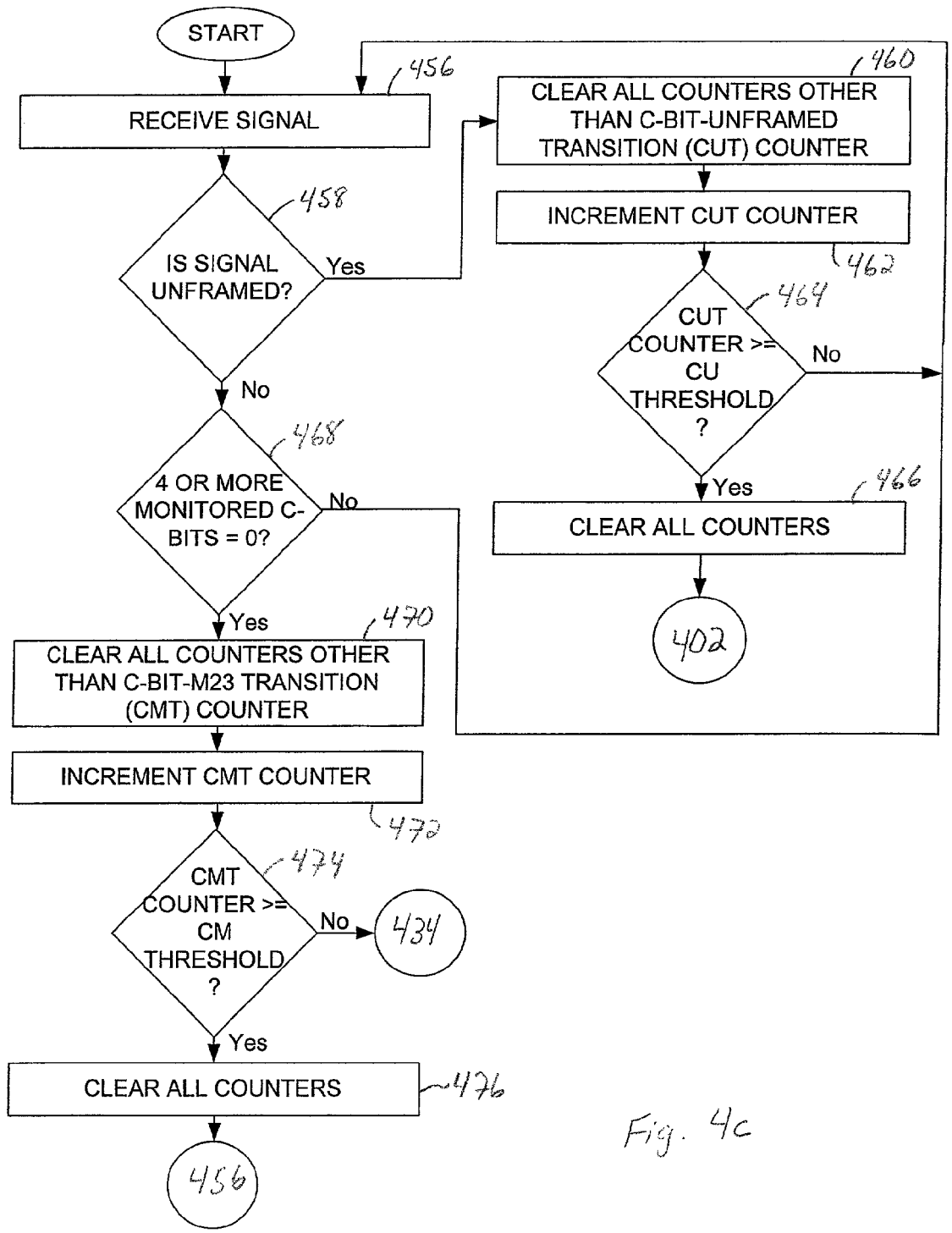

FIGS. 3a-c are a general representation of the steps associated with automatically detecting a frame format. In one embodiment, the disposition of C-bits in a frame of a signal are used to automatically characterize a frame format. With reference to FIGS. 4a-c, the steps associated with one specific method of automatically detecting a frame format using the outline of FIGS. 3a-c will be described. Specifically, FIG. 4a is a process flow diagram which illustrates the steps associated with a processing a signal which contains frames that are initially assumed to be of an unframed format in accordance with an embodiment of the present invention, while FIG. 4b is a process flow diagram which illustrates the steps associated with processing an M23 signal in accordance with an embodiment of the present invention, and FIG. 4c is a process flow diagram which illustrates the steps associated with processing a C-Bit signal in accordance with an embodiment of the present invention.

A process 400 of automatically detecting a frame format begins at step 402 in which a signal, or more specifically, a frame of a signal, is received. Once the signal is received, a determination is made in step 404 regarding whether the signal is unframed. It should be appreciated that substantially any suitable method, including methods which are well known in the art, may be used to determine whether a signal is unframed. One suitable method is described below with reference to FIG. 5.

If it is determined in step 404 that the signal is unframed, then the indication is that either the signal is still unframed, e.g., when previous frames of the signal were initially known to be of an unframed format, or the assumption that the signal was unframed is correct. Accordingly, process flow proceeds from step 404 to step 406 in which substantially all counters other than the counter which tracks an unframed format to unframed format transition (UUT) are effectively cleared. Once substantially all counters other than the UUT counter are cleared, the UUT counter is incremented in step 410 to indicate that a transition from an unframed format to an unframed format between frames has effectively been recorded.

A determination is made in step 410 as to whether the value of the UUT counter is greater than or equal to an associated unframed format to unframed format (UU) threshold. If it is determined that the UUT counter is either not equal to or does not exceed the UU threshold, then process flow returns to step 402 in which additional frames of the signal are received. Alternatively, if it is determined that the UUT counter is greater than or equal to the UU threshold, then all counters are cleared in step 412, and process flow moves from step 412 to step 402 in which additional frames of the signal are received.

Returning to step 404, if it is determined that the signal is not unframed, then the implication is that the signal is either an M23 signal or a C-Bit signal. It should be understood that the criteria used to determine whether the signal is consistent with an M23 signal or a C-Bit signal may vary widely. For example, in one embodiment, if eight consecutive frames are of a C-Bit format, then the signal is considered to be of a C-Bit format. The percentage of the predetermined number of frames that are expected to be of a C-Bit format in order for the signal which includes the frames to be considered to be of a C-Bit format may generally vary. It has been observed, however, that even given a relatively high bit error rate, e.g., a bit error rate of approximately 1E-3, the probability of incorrectly declaring a C-Bit format when eight consecutive frames are consistent with a C-Bit format is relatively low, e.g., on the order of approximately 1.3E-12.

In the described embodiment, to determine if the signal is of a C-Bit format, a determination is made in step 414 regarding whether all monitored C-bits within a current frame are set to a value of one. If all C-bits in the current frame are set to one, then the indication is that the current frame is consistent with a C-Bit format. Hence, process flow proceeds to step 416 in which substantially all counters other than an unframed format to C-Bit format transition (UCT) counter are cleared. In step 418, the UCT counter is incremented, and in step 420, a determination is made regarding whether the value of the UCT counter is greater than or equal to an unframed format to C-Bit format (UC) threshold. The UC threshold is typically arranged to indicate a number of consecutive frames which have all monitored C-bits set to one that is considered to be characteristic of an overall C-Bit format. As previously mentioned, the threshold may be eight consecutive frames which have monitored C-bits set to one.

When it is determined in step 420 that the UCT counter is less than the UC threshold, then process flow returns to step 402 in which the next frame in the signal is received. Alternatively, if it is determined in step 420 that the UCT counter exceeds or is equal to the UC threshold, substantially all counters are cleared in step 422. It should be appreciated that once it is determined that the UCT counter exceeds or is equal to the UC threshold, then the signal is effectively identified as being of a C-Bit format. In one embodiment, such an identification is associated with updating a display to indicate that the signal is of a C-Bit format.

After the counters are cleared in step 422, another frame of the signal is received in step 456. A determination is then made in step 458 as to whether the frame and, hence, the signal, is consistent with an unframed format. If it is determined in step 458 that the signal is unframed, then in step 460, substantially all counters other than the counter which tracks an C-Bit format to unframed format transition (CUT) are effectively cleared. Once substantially all counters other than the CUT counter are cleared, the CUT counter is incremented in step 462 to indicate that a frame that is consistent with an unframed format has effectively been identified.

A determination is made in step 464 as to whether the value of the CUT counter is greater than or equal to an associated C-Bit format to unframed format (CU) threshold. If it is determined that the CUT counter is either not equal to or does not exceed the CU threshold, then process flow returns to step 456 in which additional frames of the signal are received. Alternatively, if it is determined that the CUT counter is greater than or equal to the CU threshold, then all counters are cleared in step 412, and the indication is that the signal is currently of an unframed format. As such, once the counters are cleared, process flow returns to step 402 in which additional frames of the signal are received.

If it is determined in step 458 that the signal is not unframed, then a determination is made in step 468 as to whether the signal or, more specifically, the current frame of the signal, is of an M23 format. In one embodiment, a frame is considered to be consistent with an M23 format if four of more of the monitored C-bits in the frame are set to a value of zero. Typically, even if a relatively high bit error rate, e.g., a bit error rate on the order of approximately 1E-3, is in existence, the probability of incorrectly declaring an M23 format is still relatively low, e.g., on the order of approximately 3.3E-10. It should be appreciated that when more accuracy is desired when an M23 format is declared, the criterion used to determine an M23 format may be altered. Similarly, the criterion may also be altered when less accuracy is considered to be acceptable. In general, the criteria used to determine whether a frame is consistent with an M23 format may be widely varied.

If the determination in step 468 is that four or more of the monitored C-bits are not set to zero, then the implication is that the frame is consistent with a C-Bit format. As such, process flow returns to step 456 in which the signal is effectively received as a C-Bit signal. On the other hand, if it is determined in step 468 that four or more of the monitored C-bits are set to a value of zero, then the current frame is considered to be consistent with an M23 format. As such, substantially all counters other than a C-Bit format to M23 format transition (CMT) counter are cleared in step 470. Then, in step 472, the CMT counter is incremented. A determination is made in step 474 regarding whether the CMT counter is equal to or exceeds a C-Bit format to M23 format (CM) threshold.

When it is determined that the CMT counter exceeds the CM threshold, then the signal is effectively an M23 signal, and substantially all counters are cleared in step 476. After the counters are cleared, the next frame in the signal is received in step 434. Upon receiving the frame, a determination is made if the frame or, more generally, the overall signal is unframed in step 436. If it is determined in step 436 that the signal is unframed, substantially all counters other than the counter which tracks an M23 format to unframed format transition (MUT) are effectively cleared in step 438. The MUT counter is then incremented in step 440 to indicate that at least one frame that is consistent with an unframed format has effectively been recorded.

A determination is then made in step 440 as to whether the value of the MUT counter is greater than or equal to an associated M23 format to unframed format (MU) threshold. That is, it is determined in step 440 whether enough frames, e.g., consecutive frames, which are consistent with an unframed format have been identified to qualify the overall signal as being of an unframed format. If it is determined that the MUT counter is less than the MU threshold, then process flow returns to step 434 in which additional frames of the signal are received. Alternatively, if it is determined that the MUT counter is at least equal to the MU threshold, then the indication is that the signal is of an unframed format. As a result, all counters are cleared in step 444, and process flow returns to step 402 in which additional frames of the signal are received.

Returning to step 436, if it is determined that the current received frame of the signal is not unframed, the indication is that the signal is either of an M23 format or a C-Bit format. Accordingly, a determination is made is step 446 as to whether the current frame of the signal is of a C-Bit format. In the described embodiment, such a determination, as described above, may include determining if all monitored C-bits of the current frame are set to a value of one. If it is determined that all monitored C-bits are not set to a value of one, then the signal is considered to still be of an M23 format, and process flow returns to step 434 in which another frame is received.

On the other hand, if it is determined in step 446 that all monitored C-bits are set to a value of one, then substantially all counters other than an M23 format to C-Bit format transition (MCT) counter are cleared in step 448. The MCT counter is then incremented in step 450 to indicate that the current frame is consistent with a C-Bit format. Once the MCT counter is incremented, a determination is made in step 452 as to whether the MCT counter exceeds an M23 format to C-Bit format (MC) threshold. If it is determined that the MCT counter is less than the MC threshold, then process flow returns to step 434 in which additional frames are received.

If, however, the determination in step 452 is that the MCT counter is either greater than or equal to the MC threshold, then the indication is that the signal is of a C-Bit format. When the indication is that the signal is of a C-Bit format, then all counters are cleared in step 454, and process flow proceeds to step 456 in which an additional frame of the signal is received.

Referring back to step 414, if it is determined that not all monitored C-bits are set to a value of one, a determination is made in step 424 as to whether four or more monitored C-bits are set to a value of zero. In the described embodiment, when four or more monitored C-bits of a current frame are set to a value of zero, the frame is assumed to be of an M23 format. If it is determined in step 424 that fewer than four C-bits are set to zero, then the indication is that the frame is of an unframed format. Accordingly, process flow returns to step 402 in which another frame is received.

Alternatively, if it is determined in step 424 that four or more monitored C-bits in the current frame are set to a value of zero, then substantially all counters other than an unframed format to M23 format transition (UMT) counter are cleared in step 426. Then, in step 428, the UMT counter is incremented to account for the fact that the current frame is consistent with an M23 format.

In step 430, a determination is made regarding whether the value of the UMT counter exceeds an unframed format to M23 format (UM) threshold. That is, it is determined whether the number of substantially consecutive frames which have been identified as exhibiting M23 format characteristics is sufficient to indicate that the signal is of an M23 format. If it is determined that the UMT counter has a value that is less than that of the UM threshold, then process flow proceeds to step 402 in which additional frames are received. On the other hand, if it is determined that the value of the UMT counter exceeds the UM threshold, then all counters are cleared in step 432, and process flow moves to step 434 in which additional frames are received.

Figure 5:
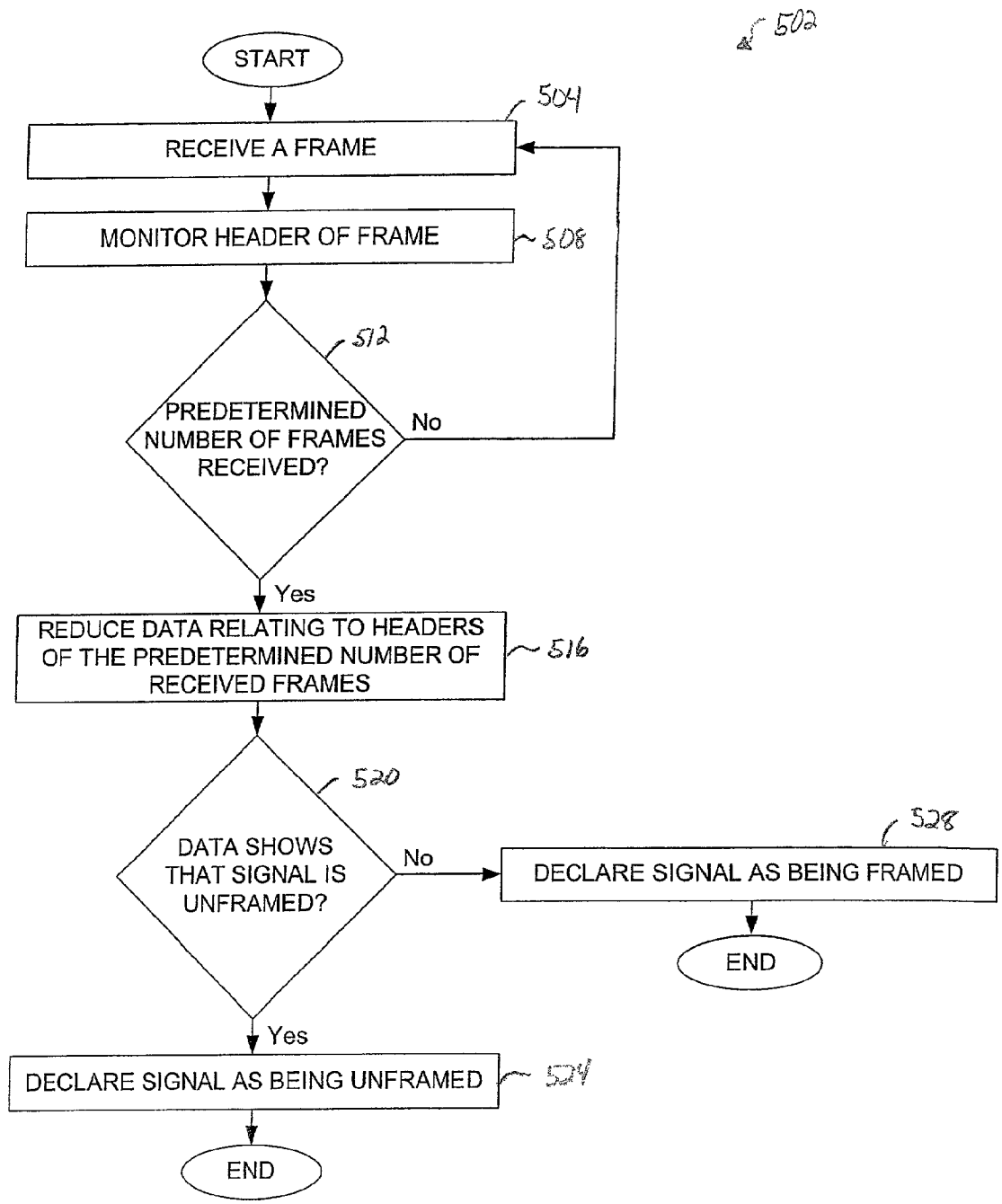
FIG. 5 is a process flow diagram which illustrates the steps associated with one method of ascertaining whether a DS3 signal is out of frame in accordance with an embodiment of the present invention.

As previously mentioned, it should be appreciated that the steps associated with characterizing a signal as being unframed may vary widely. One suitable method for characterizing a signal as unframed will be described below with respect to FIG. 5. FIG. 5 is a process flow diagram which illustrates the steps associated with one method of ascertaining whether a DS3 signal is out of frame in accordance with an embodiment of the present invention. A process of determining whether a signal is out of frame begins at step 504 in which a frame is received. In general, the frame is received on a port over a network link. Once the frame is received, the header of the frame is monitored, or otherwise read, in step 508. A determination is then made in step 512 regarding whether a predetermined number of frames has been received. In one embodiment, a determination of whether a signal is out of frame may be made after at least sixteen frames of the signal have been received, although it should be appreciated that the number of frames used in a determination of whether a signal is out of frame may be widely varied.

If it is determined that a predetermined number of frames has not been received, then process flow returns to step 504 in which an additional frame is received. Alternatively, if it is determined that a predetermined number of frames has been received, then the data obtained by monitoring the headers of received frame may be reduced in step 516. In other words, information contained in the headers of the predetermined number of frames is studied.

A determination is then made in step 520 regarding whether the data indicates that the signal is unframed. While the criteria used to determine whether a signal is unframed may vary, one suitable criteria involves determining whether a particular sequence of bits is present in some of the headers. For example, if a particular sequence of bits is observed in more than a threshold percentage of the received frames, then the signal is considered to be unframed. If it is determined that the signal is unframed, then in step 524, the signal is declared as being unframed. Once the signal is declared, or otherwise identified, as being unframed, the process of determining whether a DS3 signal is out of frame is completed. Alternatively, if it is determined in step 520 that the data shows that the signal is framed, then the signal is declared as being framed in step 528, and the process of determining whether the DS3 frame is out of frame is completed.

Figure 6:
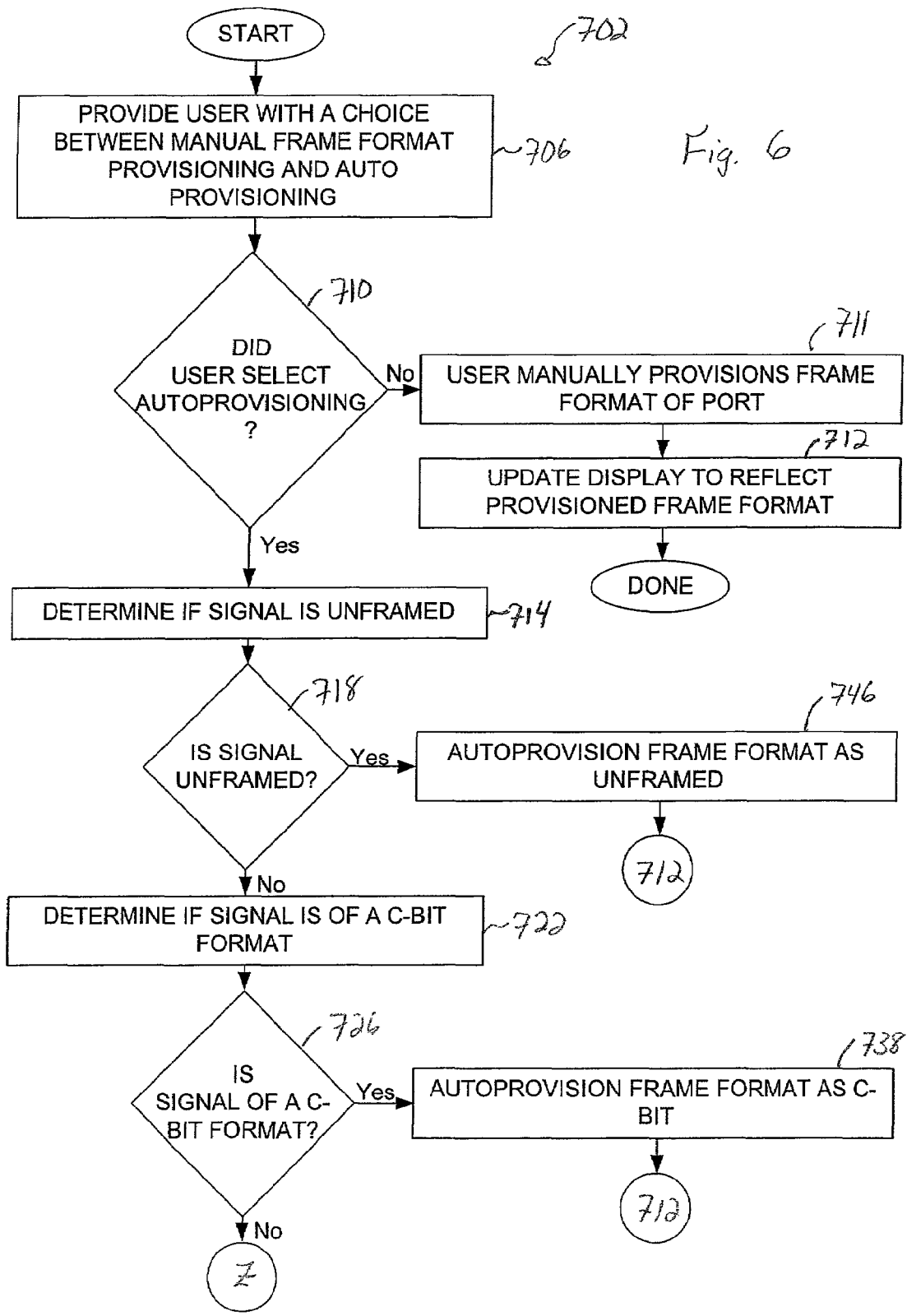
FIGS. 6 and 7 are a process flow diagram which illustrates the steps associated with one method of provisioning a monitored port using a real-time detection process in accordance with an embodiment of the present invention.
Figure 7:
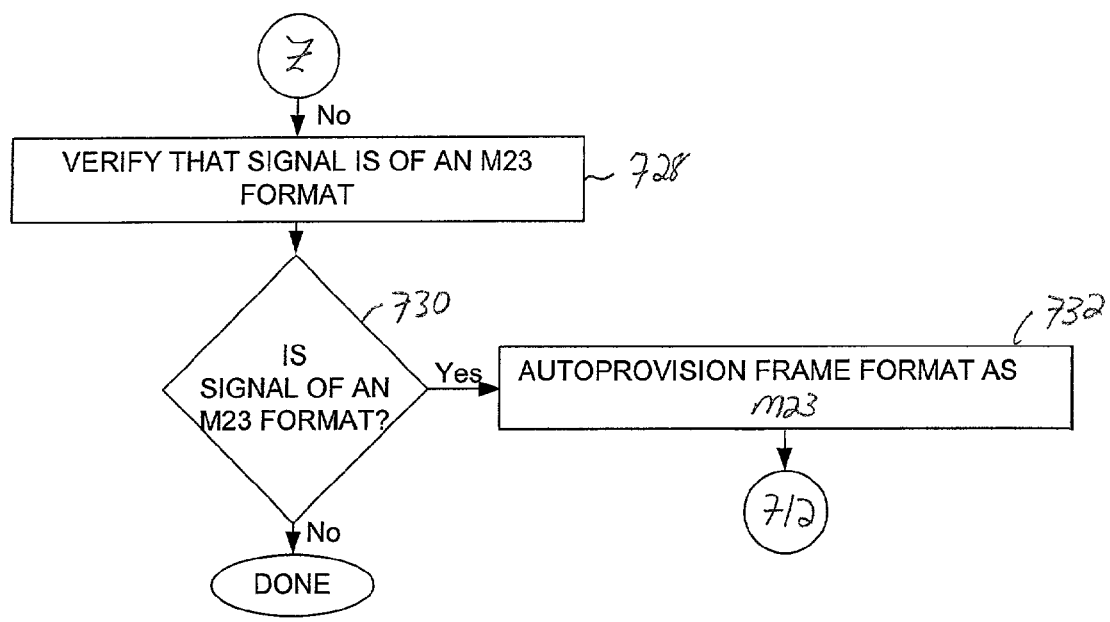

Referring next to FIGS. 6 and 7, one method of provisioning a monitored port using a real-time detection process will be described in accordance with an embodiment of the present invention. A process 702 of provisioning a monitored port begins at a step 706 in which a user, e.g., a network administrator, is provided with a choice between manually provisioning a port or ports, and automatically provisioning the port or ports. When provided with the choice, the user may elect to either manually provision a port or have the port automatically provisioned. Typically, the choice is provided to the user through a user interface associated with a display, e.g., a GUI. In step 710, a determination is made regarding the user has selected manual provisioning or automatic provisioning. Specifically, a determination is made as to whether the user selected automatic provisioning.

In one embodiment the selection of a provisioning type is either made before a signal is received on a port which is to be provisioned or before the framing format of the signal is determined. If the determination in step 710 is that the user did not select automatic provisioning, or "autoprovisioning," then in step 711, the user manually provisions the frame format of the port. In general, the user may use any suitable method for provisioning the port. One suitable method may involve identifying the format of the signal by viewing the display, then provisioning the port using any conventional method to be consistent with the identified format. After the user manually provisions the frame format of the port, then the display may be updated in step 712 to identify the type of signal the port is provisioned to received. That is, the display is updated to reflect the provisioned frame format. Once the display is updated, the process of automatically provisioning a monitored port is completed.

Returning to step 710, if it is determined that the user selected automatic provisioning, then process flow moves from step 710 to step 714 in which a determination is made regarding whether a signal received on the port is unframed. One method of determining whether a signal is unframed was discussed above with respect to FIG. 5. It should be appreciated, however, that substantially any suitable method may be used to determine whether a signal is unframed. In step 718, if it is determined that the signal is framed or not of an unframed format, then in step 722, it is determined whether the signal is of a C-Bit format. If it is determined in step 726 that the signal is not of an C-Bit format, then process flow proceeds to step 728 in which it is verified that the signal is of an M23 format. If it is determined in step 730 that the signal is not of a M23 format, then the process of provisioning a monitored port is completed. It should be understood that, in general, if it is determined that a signal is not unframed and not of a C-Bit format, then the signal is typically assumed to be of an M23 format.

If it is determined in step 730 that the signal has been verified as being of an M23 format, then the frame format is automatically provisioned in step 732 to be consistent with an M23 format. Once the port is automatically provisioned, process flow proceeds to step 712 in which the display is updated to reflect the provisioned frame format.

Returning to step 726, if it is determined that the signal is of a C-Bit format, then process flow proceeds to step 738 in which the port is automatically provisioned as being of a C-Bit format. After the port is automatically provisioned in step 738, process flow moves to step 712 in which the display is updated to reflect the provisioned frame format. Likewise, referring back to step 718, if it is determined that the signal is unframed, then the port is automatically provisioned as being of an unframed format in step 746. Once the port is automatically provisioned as being of an unframed format, the display is updated accordingly in step 712.

In general, the provisioning of a monitored frame is a static process. That is, once a port is provisioned, that port remains provisioned until a user requests that the port be automatically provisioned again, or until the user decides to manually provision the port again. A user may decide to reprovision a port, for example, in the event that the frame format of a received signal has changed since the port was initially provisioned. In order to facilitate reprovisioning, the display may provide a visual "alarm" which alerts the user when there is a perceived inconsistency between the frame format of a signal received on a port and the provisioning type of the port.

As described above with respect to FIG. 2, a computing device such as computing device 216, which includes a display, may be a part of an overall system which automatically detects frame format types and also automatically provisions ports based on detected frame formats. Typically, a computing device is in communication with a hardware device, e.g., detection/provisioning device 212 of FIG. 2, and uses information from the hardware device to update a graphical user interface displayed on a display device, e.g., display device 220 of FIG. 2. In one embodiment, however, a computing device may process raw information extracted by a hardware device in addition to updating a display. That is, a computing device may effectively use data obtained by a hardware device which monitors a port to automatically detect a frame format of a signal received by the port, and to automatically provision the port.

Figure 8:
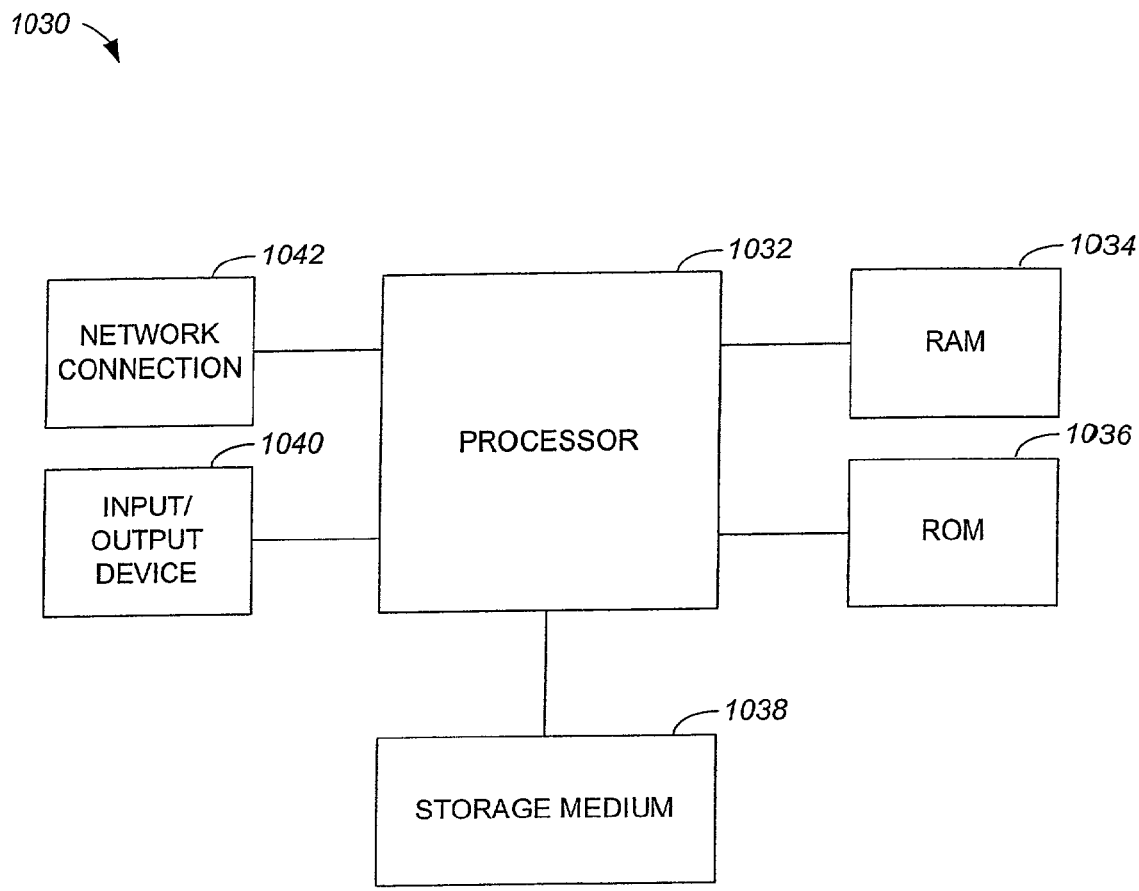
FIG. 8 is a representation of a computing device which is suitable for implementing the present invention.

FIG. 8 illustrates a typical, general purpose computing device or computer system suitable for implementing the present invention. A computer system 1030 includes any number of processors 1032 (also referred to as central processing units, or CPUs) that are coupled to memory devices including primary storage devices 1034 (typically a random access memory, or RAM) and primary storage devices 1036 (typically a read only memory, or ROM). ROM acts to transfer data and instructions uni-directionally to the CPU 1032, while RAM is used typically to transfer data and instructions in a bi-directional manner.

CPU 1032 may generally include any number of processors. Both primary storage devices 1034, 1036 may include any suitable computer-readable media. A secondary storage medium 1038, which is typically a mass memory device, is also coupled bi-directionally to CPU 1032 and provides additional data storage capacity. The mass memory device 1038 is a computer-readable medium that may be used to store programs including computer code, data, and the like. Typically, mass memory device 1038 is a storage medium such as a hard disk or a tape which is generally slower than primary storage devices 1034, 1036. Mass memory storage device 1038 may take the form of a magnetic or paper tape reader or some other well-known device. It will be appreciated that the information retained within the mass memory device 1038, may, in appropriate cases, be incorporated in standard fashion as part of RAM 1036 as virtual memory. A specific primary storage device 1034 such as a CD-ROM may also pass data uni-directionally to the CPU 1032.

CPU 1032 is also coupled to one or more input/output devices 1040 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 1032 optionally may be coupled to a computer or telecommunications network, e.g., a local area network, an internet network or an intranet network, using a network connection as shown generally at 1042. With such a network connection, it is contemplated that the CPU 1032 might receive information from the network, or might output information to the network in the course of performing the above-described method steps. Such information, which is often represented as a sequence of instructions to be executed using CPU 1032, may be received from and outputted to the network, for example, in the form of a computer data signal embodied in a carrier wave. The above-described devices and materials will be familiar to those of skill in the computer hardware and software arts.

Figure 9A:
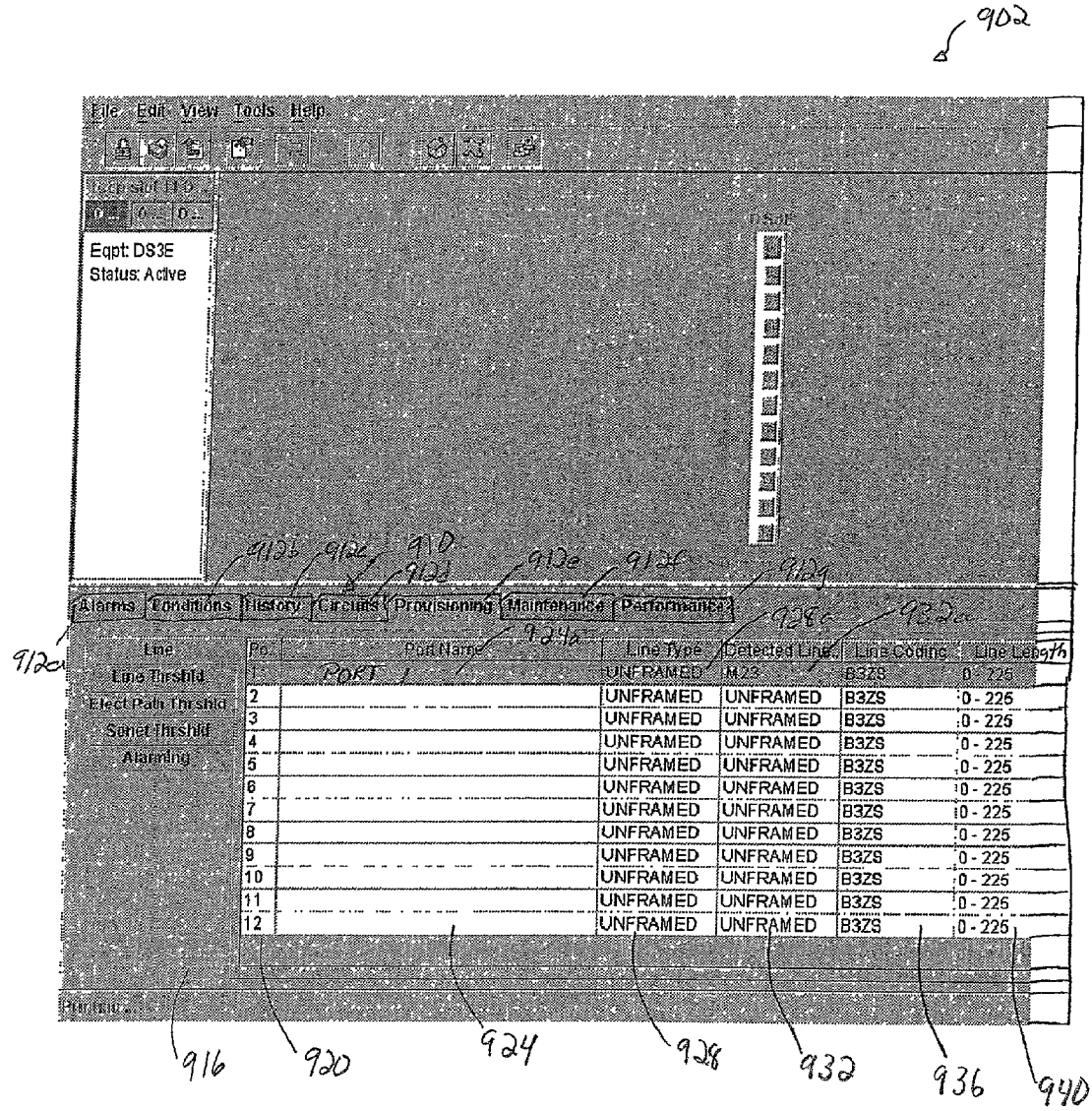
FIG. 9*a* is a diagrammatic representation of a display screen associated with a display device, i.e., display device 220 of FIG. 2, in accordance with an embodiment of the present invention
Figure 9B:
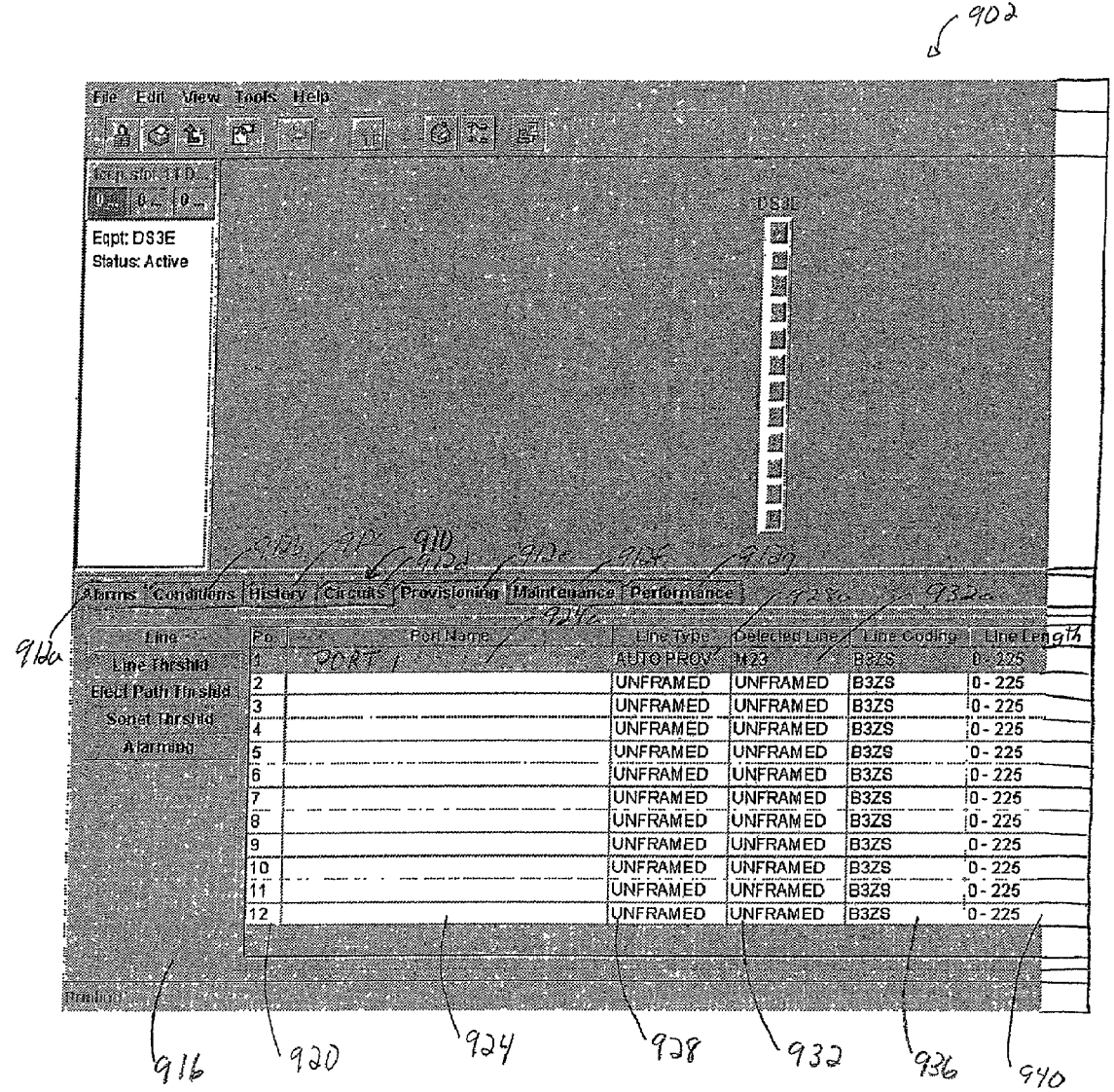
FIG. 9*b* is a diagrammatic representation of a display screen, i.e., display screen 902 of FIG. 9*a*, while a port is being automatically provisioned in accordance with an embodiment of the present invention

As discussed above, a GUI generally allows a user to view information relating to the frame format of a signal received over a communications link or line by a port. Such a GUI may also allow a user to select a provisioning option, then display the provisioning status of the port. In general, the GUI which presents a user with information regarding a detected signal, or line, format and information regarding the format of signals for which a port has been provisioned may have substantially any suitable layout. One example of a suitable GUI is shown in FIGS. 9a and 9b. FIG. 9a is a diagrammatic representation of a display screen associated with a display device, i.e., display device 220 of FIG. 2, in accordance with an embodiment of the present invention. A display screen 902 includes a menu bar 910 which includes menu selections 912. When a menu selection 912 is selected, display screen 902 displays features associated with the selected menu selection 912 in a section 916 of display screen 902.

As shown, a menu selection 912e which causes provisioning features to be displayed has been selected. When provisioning features are displayed in section 916, port identifiers 920 and port names 924 are displayed. A line type 928, or a frame format which a port is configured to expect, is also displayed, as are a detected line type 932, a line coding type 936, and a line length 940. Line type 928 may also include information regarding whether a port is to be automatically provisioned or manually provisioned. Displaying detected line type 932, or the detected frame format of a signal received over a line, enables a user to view the format of a signal that is being received in real-time, as detected line type 932 is updated or otherwise refreshed to reflect the frame format of the signal that is currently being received. Displaying line coding type 936 allows a user to readily identify the type of coding associated with specific lines, e.g., bipolar with three zero substitution (B3ZS), while displaying line length 940 allows for the length of received lines to be readily identified in terms of how it has been provisioned.

A line type 932a of a first port 924a, as indicated in section 916, is an M23 format, while first port 924a is provisioned to expect signals of an unframed format. In one embodiment, configuring or provisioning a port to expect signals of an unframed format may essentially be a "default" condition. That is, a port may be substantially automatically provisioned to receive signals that are out-of-frame unless otherwise provisioned. To provision first port 924a, a user may elect to have first port 924a be automatically provisioned. When such a selection is made, e.g., using display 902, detected line type 928a may be updated to indicate that automatic provisioning is in process, as indicated in FIG. 9b. An automatic provisioning process such as process 702 of FIGS. 7a and 7b typically includes updating the provisioning status, or detected line type 928a, after first port 924a is provisioned. For example, after the first port is automatically provisioned, the frame format that the first port is provisioned to receive will typically be displayed in place of the "automatically provisioning" status displayed as detected line type 928a.

Other menu selections 912 which are included in menu bar 910 include an alarm menu selection 912a. Alarm menu selection 912a may display a window within section 916 which enables a user to select a type of alarm, e.g., audio or visual, which alerts the user of various conditions. Such conditions may include, but are not limited to, a mismatch between the configuration of the port and the frame format of the signal being received, and a delay in manually provisioning a port when the user has elected to manually provision the port.

Although only a few embodiments of the present invention have been described, it should be understood that the present invention may be embodied in many other specific forms without departing from the spirit or the scope of the present invention. By way of example, the criteria used in determining whether a signal is of an unframed format, an M23 format, or a C-Bit format may vary. As described above, when three or more frames out of sixteen frames is missing a particular sequence of header bits, the signal which includes the sixteen frames is considered to be of an unframed format. However, it should be understood that the ratio of frames with the particular sequence of header bits to total frames which is used to determine whether a signal is of an unframed format may vary, e.g., based on statistical information which may indicate the likelihood that a particular ratio causes an incorrect declaration of an unframed format.

Similarly, the number of bits which are used to characterize a frame as being of an M23 format may vary. Additionally, the number of frames which are characterized as being of an M23 format before an overall signal is declared as being of an M23 format may also vary. In other words, the thresholds associated with characterizing the frames as being of a particular format may vary widely. The number of consecutive frames which include C-Bits set to a value of one and are used to declare a signal as being of a C-Bit format may also be varied as required by a particular system.

While an automatic detection process has been described as being implemented with respect to a DS3 signal, it should be appreciated that the automatic detection process may be used with substantially any other suitable signal. Suitable signals with frame formats or bit rates which may be automatically detected include, but are not limited to, DS1 signals, E1 signals, E3 signals, synchronous transport signals, and substantially any optical carrier (OC) signal associated with a synchronous optical network (SONET) format or a synchronous digital hierarchy (SDH) format. An automatic detection process may be used with the signals to determine, in real-time, signal characteristics which may include, for instance, frame formats and bit rates.

As described above, an automatic provisioning process is effectively a static process. In other words, once a port is automatically provisioned, although the format of the signal being received on the port is typically constantly monitored, the port is not provisioned to accommodate a changed signal format. For example, if a port is provisioned to receive a signal of an M23 format, even if the received signal is eventually unframed, the port remains provisioned to receive a signal of an M23 format. It should be appreciated, however, that in one embodiment, an automatic provisioning process may be a dynamic process. In a dynamic automatic provisioning process, a port may be provisioned substantially each time an automatic detection process detects a change in frame format.

A device which automatically detects a frame format of a signal have been described as being coupled to, or in communication with, a port, e.g., a frame format detection mechanism may be a part of a line card which includes a port. In one embodiment, such a device may instead be coupled to a line or a communications link without departing from the spirit or the scope of the present invention.

While a hardware device such as detection device 212 of FIG. 2 has been described as executing a frame format detection algorithm, a frame format detection algorithm may also be executed in software. By way of example, a hardware device may extract information from frames, and a computing device may execute software associated with a frame format detection algorithm to determine the frame format associated with the frames. The use of a hardware device to extract information and to execute a frame format detection algorithm generally allows for a faster polling or sampling rate. However, for an embodiment in which a slower polling rate is acceptable, both a data extraction algorithm and a frame format detection algorithm may be executed in software.

A GUI or other display which provides a user with real-time frame format detection and provisioning information may generally have a widely varied layout or format depending upon the requirements of a particular system. That is, the display which displays frame format information to a user may take a variety of different formats. In one embodiment, the display may include additional information which includes, but is not limited to, the number of frames which have been received on a particular port.

In general, the steps associated with methods of automatically detecting a frame format and provisioning a monitored port may be widely varied. Steps may be added, removed, altered, or reordered without departing from the spirit or the scope of the present invention. For example, during automatic detection, rather than first checking whether a signal is of an unframed format before determining whether the signal is of an M23 format or a C-Bit format, the signal may first be checked for either an M23 format or a C-Bit format. Additionally, in lieu of verifying that a signal is of a C-Bit format if it is determined not to be of an M23 format, a signal may effectively be assumed to be of an M23 format if it is determined that the signal is not of a C-Bit format. Further, in one embodiment, if it is determined that a signal is not of an M23 format it may not be necessary to verify that the signal is of a C-Bit format, i.e., a C-Bit format may be assumed, without departing from the spirit or the scope of the present invention. Therefore, the present examples are to be considered as illustrative and not restrictive, and the invention is not to be limited to the details given herein, but may be modified within the scope of the appended claims.

What is claimed is:

1. A framing format detection mechanism, the framing format detection mechanism being suitable for use in a network within which a data signal is arranged to be transmitted, the framing format detection mechanism comprising:

a first device, the first device being arranged to be a part of a line card, the first device further being arranged to be in communication with a port on the line card, the port being arranged to receive the data signal, the first device being further arranged to process frames contained in the data signal to automatically determine a frame format associated with the data signal, wherein the frame format is one of a C-Bit format, an M23 format, and an unframed format; and a second device, the second device being arranged to display the frame format associated with the data signal substantially in real-time.

2. A framing format detection mechanism according to claim 1 wherein the first device is further arranged to automatically provision the port.

3. A framing format detection mechanism according to claim 2 wherein the first device is arranged to automatically provision the port to be consistent with the frame format.

4. A framing format detection mechanism according to claim 3 wherein the second device is further arranged to display a provisioned format of the port.

5. A framing format detection mechanism according to claim 1 wherein the data signal is a DS3 signal.

6. A framing format detection mechanism according to claim 1 wherein the first device is arranged to process the frames by reading a plurality of bits contained in the frame.

7. A framing format detection mechanism according to claim 6 wherein the plurality of bits are one of C-bits and framing bits.

8. A system for provisioning a port of a line card, the port being arranged to receive a DS3 signal transmitted across a communications link, the system comprising:
   means for receiving a plurality of frames on the port, the plurality of frames being included in the signal;
   means for automatically determining a frame format associated with the plurality of frames, wherein the frame format of the plurality of frames is automatically determined to be one of a C-bit format, an M23 format, and an unframed format, using the received plurality of frames; and
   means for displaying the frame format associated with the plurality of frames.

9. A system according to claim 8 further including:
   means for automatically configuring the port based on the frame format associated with the plurality of frames.

10. A system according to claim 9 further including:
    means for manually configuring the port; and
    means for allowing a selection to be made between manually configuring the port and automatically configuring the port.

11. A system according to claim 10 wherein the means for displaying the frame format associated with the plurality of frames is further arranged to display a configuration status of the port.

12. A system for provisioning a port of a line card, the port being arranged to receive a DS3 signal transmitted across a communications link, the system comprising:
    a processor;
    computer code that causes a plurality of frames to be received on the port, the plurality of frames being included in the signal;
    computer code that causes an automatic determination of a frame format associated with the signal, wherein the frame format of the signal is automatically determined to be one of a C-Bit format, an M23 format, and an unframed format, using the received plurality of frames;
    computer code that causes the frame format associated with the signal to be displayed; and
    a memory device that stores the computer codes.

13. A system according to claim 12 further including:
    computer code that causes an automatic configuration of the port based on the frame format associated with the plurality of frames.

14. A system according to claim 13 wherein the computer code that causes the frame format of the signal to be displayed includes computer code that causes a configuration status of the port to be displayed.

15. A line card, the line card being suitable for use with a router in a data transmissions network, the line card comprising:
    a port, the port being arranged to be coupled to a data transmissions link, the port further being arranged to receive a DS3 data signal through the data transmissions link;
    a detection mechanism, the detection mechanism being arranged to monitor the port, the detection mechanism further being arranged to automatically determine a frame format of the data signal received on the port is consistent with an out-of-frame format, is consistent with an M23 frame when it is determined that the frame format of the data signal is not consistent with the out-of-frame format, and is consistent with a C-Bit frame format when it is determined that the frame format of the data signal is not consistent with the M23 frame format; and
    a provisioning mechanism, the provisioning mechanism being arranged to provision the port.

16. A line card according to claim 15 wherein the provisioning mechanism is arranged to automatically provision the port to be consistent with the determined frame format of the data signal.

17. A line card according to claim 15 wherein the detection mechanism is further arranged to read bits from a plurality of frames of the data signal and to process the bits to automatically determine the frame format of the data signal.

18. A line card according to claim 17 wherein the bits are at least one of header bits and stuff control bits associated with the frames.

19. A line card according to claim 15 further including:
    an interface mechanism, an interface mechanism being arranged to provide information associated with the frame format of the data signal and a provisioning status of the port to a display mechanism.

20. A line card according to claim 15 wherein the provisioning mechanism is arranged to automatically provision the port to support one selected from the group including a C-bit format, an M23 format and an unframed format.

21. A line card according to claim 20 wherein the provisioning mechanism is arranged to utilize the frame format determined by the detection mechanism to automatically provision the port.

22. A method for provisioning a port associated with a line card, the method comprising:
    receiving a plurality of frames of a signal on the port, the plurality of frames being included in the signal;
    automatically determining a frame format of the signal, wherein the frame format of the signal is automatically determined using the plurality of frames received on the port, further including:
      automatically determining when at least a first frame of the plurality of frames is consistent with a first format;
      automatically determining when at least a second frame of the plurality of frames is consistent with a second format when it is determined that the first frame is not consistent with the first format; and
      identifying the frame format of the signal as being consistent with a third format when it is determined that the second frame is not consistent with the second format; and
    configuring the port based on the frame format of the signal.

23. A method as recited in claim 22 wherein automatically determining the frame format of the signal includes automatically determining the frame format of the signal using circuitry associated with the line card, and configuring the port includes automatically configuring the port using the circuitry associated with the line card.

24. A method as recited in claim 22 further including:
determining when the port is to be configured automatically using circuitry associated with the line card, wherein when it is determined that the port is to be automatically configured, the port is automatically configured based on the frame format of the signal.

25. A method as recited in claim 24 wherein when it is determined that the port is not to be automatically configured, the port is manually configured based on the frame format of the signal.

26. A method as recited in claim 22 further including:
updating a display to indicate that the frame format of the signal is consistent with the third format when it is determined that the second frame is not consistent with the second format;
updating the display to indicate that the frame format of the signal is consistent with the first format when it is determined that the first frame is consistent with the first format;
updating the display to indicate that the frame format of the signal is consistent with the second format when it is determined that the second frame is consistent with the second format; and
updating the display to display the configuration of the port.

27. A method as recited in claim 22 wherein the signal is a DS3 signal, and first format is an out-of-frame format, the second format is an M23 format, and the third format is a C-Bit format.

28. A method as recited in claim 27 wherein automatically determining when at least the first frame of the plurality of frames is consistent with the first format includes:
reading header bits of a first set of frames of the plurality of frames, the first set of frames including the first frame; and
determining when the header bits of each of a predetermined number of frames of the first set of frames includes a predetermined pattern of bits, wherein when the header bits of each of a predetermined number of frames includes the predetermined pattern of bits, the frame format of the signal is consistent with the first format.

29. A method as recited in claim 27 wherein automatically determining when at least the second frame of the plurality of frames is consistent with the first format includes:
reading a plurality of C-bits of at least the second frame; and
determining when the plurality of C-bits of at least the second frame indicate that at least the second frame is consistent with the first format, wherein when the plurality of C-bits of at least the second frame indicate that at least the second frame is consistent with the first format, the frame format of the signal is consistent with the first format.

30. A method as recited in claim 27 wherein identifying the frame format of the signal as being consistent with the third format includes automatically determining when at least a third frame of the plurality of frames is consistent with the third format, wherein automatically determining when at least the third frame of the plurality of frames is consistent with the third format includes:
reading a plurality of C-bits of a first set of frames of the plurality of frames, the first set of frames including at least the third frame; and
determining when the plurality of C-bits of each of a predetermined number of frames of the first set of frames includes bits that indicate that each of the predetermined number of frames is consistent with the third format, wherein when the plurality of C-bits of each of the predetermined number of frames is consistent with the third format, the frame format of the signal is consistent with the third format.

31. A method as recited in claim 22 further including:
displaying the frame format of the signal; and
displaying a configuration of the port after the port is configured.

32. A memory device that stores computer codes for provisioning a port associated with a line card comprising:
computer code that causes a plurality of frames of a signal to be received on the port, the plurality of frames being included in the signal;
computer code that causes an automatic determination of a frame format of the signal, wherein the frame format of the signal is automatically determined using the plurality of frames received on the port, further including
computer code that causes an automatic determination regarding when at least a first frame of the plurality of frames is consistent with a first format;
computer code that causes an automatic determination regarding when at least a second frame of the plurality of frames is consistent with a second format when it is determined that the first frame is not consistent with the first format;
computer code that causes the frame format of the signal to be identified as being consistent with a third format when it is determined that the second frame is not consistent with the second format;
computer code that causes the port to be configured based on the frame format of the signal.

33. A memory device as recited in claim 32 wherein the computer code that causes an automatic determination of the frame format of the signal includes computer code that causes an automatic determination of the frame format of the signal using circuitry associated with the line card, and the computer code that causes the port to be configured includes computer code that causes an automatic configuration of the port using the circuitry associated with the line card.

34. A memory device as recited in claim 32 further including:
computer code that causes a determination of when the port is to be automatically configured using circuitry associated with the line card, wherein when it is determined that the port is to be automatically configured, the port is automatically configured based on the frame format of the signal.

35. A memory device as recited in claim 34 wherein when it is determined that the port is not to be automatically configured, the port is manually configured based on the frame format of the signal.

36. A memory device as recited in claim 32 wherein the memory device is one selected from the group consisting of a hard disk, a CD-ROM, a DVD, a computer disk, a tape drive, and a computer memory data signal embodied in a carrier wave.

* * * * *